US012699304B2

(12) United States Patent
Bae et al.

(10) Patent No.: US 12,699,304 B2
(45) Date of Patent: Aug. 4, 2026

(54) WAVELENGTH CONVERSION DEVICE

(71) Applicant: KOREA RESEARCH INSTITUTE OF STANDARDS AND SCIENCE, Daejeon (KR)

(72) Inventors: In Ho Bae, Daejeon (KR); Dong Hoon Lee, Sejong (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 294 days.

(21) Appl. No.: 18/688,451

(22) PCT Filed: Sep. 21, 2023

(86) PCT No.: PCT/KR2023/014336
§ 371 (c)(1),
(2) Date: Mar. 1, 2024

(87) PCT Pub. No.: WO2024/136020
PCT Pub. Date: Jun. 27, 2024

(65) Prior Publication Data
US 2025/0130477 A1 Apr. 24, 2025

(30) Foreign Application Priority Data

Dec. 19, 2022 (KR) ........................ 10-2022-0178754

(51) Int. Cl.
*G02F 1/365* (2006.01)
*G02F 1/35* (2006.01)
(Continued)

(52) U.S. Cl.
CPC ................ *G02F 1/365* (2013.01); *G02F 1/35* (2013.01); *G02F 1/3548* (2021.01); *G02F 1/355* (2013.01);
(Continued)

(58) Field of Classification Search
CPC .... G02F 1/3548; G02F 1/3551; G02F 1/3553; G02F 1/3558; G02F 1/365; G02F 1/37
See application file for complete search history.

(56) References Cited

U.S. PATENT DOCUMENTS 7,034,990 B2 * 4/2006 Kamijoh ............... G02F 1/3536
                                                            359/326
9,964,834 B2 * 5/2018 Moulton ............... G02F 1/3525
(Continued)

FOREIGN PATENT DOCUMENTS

JP        2011128368 A  *  6/2011   ............... G02F 1/39
JP        2011203376 A  *  10/2011  ............. G02F 1/377
(Continued)

OTHER PUBLICATIONS

International Search Report for PCT/KR2023/014336 mailed Jan. 8, 2024 from Korean Intellectual Property Office.

*Primary Examiner* — Daniel Petkovsek
(74) *Attorney, Agent, or Firm* — Paratus Law Group, PLLC

(57) ABSTRACT
A wavelength conversion device includes a nonlinear optical crystal, a guide light source configured to provide a guide light traveling in a first direction within the nonlinear optical crystal such that a thermal waveguide penetrating the nonlinear optical crystal is formed, a signal light source configured to provide a signal light having a first wavelength ($\lambda 1$) and traveling in a second direction opposite to the first direction through the thermal waveguide, and a pump light source configured to provide a pump light having a second wavelength ($\lambda 2$) and traveling in the second direction through the thermal waveguide, wherein an output light including a wavelength component corresponding to a sum of energies of the first wavelength ($\lambda 1$) and the second wavelength ($\lambda 2$) is provided from the thermal waveguide.

20 Claims, 7 Drawing Sheets

(51) Int. Cl.
  G02F 1/355    (2006.01)
  G02F 1/37    (2006.01)
(52) U.S. Cl.
  CPC .......... G02F 1/3551 (2013.01); G02F 1/3553
    (2013.01); G02F 1/3558 (2013.01); G02F
                1/37 (2013.01)

(56)      References Cited

U.S. PATENT DOCUMENTS

| | | | |
|---|---|---|---|
| 11,086,191 B2* | 8/2021 | Hall ..................... | G02F 1/3534 |
| 2004/0027648 A1* | 2/2004 | Furukawa ............ | G02F 1/3534 |
| | | | 359/328 |
| 2007/0297465 A1* | 12/2007 | Yumoto ............... | G02F 1/3775 |
| | | | 372/21 |

FOREIGN PATENT DOCUMENTS

| | | | |
|---|---|---|---|
| KR | 10-2005-0022342 A | 3/2005 | |
| KR | 10-2005-0053315 A | 6/2005 | |
| KR | 10-2008-0012018 A | 2/2008 | |
| KR | 10-2008-0110671 A | 12/2008 | |
| WO | WO 2019/038825 A1 | 2/2019 | |

* cited by examiner

Fig. 2

WAVELENGTH CONVERSION DEVICE

CROSS-REFERENCE TO RELATED APPLICATIONS

This application is a National Stage Patent Application of PCT International Application No. PCT/KR2023/014336 (filed on Sep. 21, 2023), which claims priority to Korean Patent Application No. 10-2022-0178754 (filed on Dec. 19, 2022), which are all hereby incorporated by reference in their entirety.

BACKGROUND

The present invention generally relates to a wavelength conversion device.

In modern society, laser is used for very various purposes. Laser is also used in fields such as pointing in presentations, writing, measuring distances, beauty treatments, and cutting or welding metals. This laser is lights having a single wavelength (single frequency), and wavelengths of the laser is affected by material properties and cavities of a gain medium that forms the laser beams.

SUMMARY

A technology for converting a wavelength of laser using a nonlinear optical crystal is continuously being researched. The related art is limited to providing a light having a single wavelength to the nonlinear optical crystal to output the light having a single wavelength and fails to change the wavelength of the output light over a wide range.

One of the problems to be solved by the present embodiment is to solve the difficulties of the related art. One of the problems to be solved by the present embodiment is to provide a wavelength conversion device capable of controlling a wavelength of an output light within a desired range.

According to an aspect of the present invention, there is provided a wavelength conversion device including a nonlinear optical crystal, a guide light source that provides a guide light traveling in a first direction within the nonlinear optical crystal such that a thermal waveguide penetrating the nonlinear optical crystal is formed, a signal light source that provides a signal light having a first wavelength ($\lambda$1) and traveling in a second direction opposite to the first direction through the thermal waveguide, and a pump light source that provides a pump light having a second wavelength ($\lambda$2) and traveling in the second direction through the thermal waveguide, wherein an output light including a wavelength component corresponding to a sum of energies of the first wavelength ($\lambda$1) and the second wavelength ($\lambda$2) is provided from the thermal waveguide.

According to another aspect of the present invention, there is provided a wavelength conversion device including a nonlinear optical crystal, a guide light source that provides a guide light traveling in a first direction within the nonlinear optical crystal such that a thermal waveguide penetrating the nonlinear optical crystal is formed, a signal light source that provides a signal light having a first wavelength ($\lambda$1) and traveling in the first direction through the thermal waveguide, and a pump light source that provides a pump light having a second wavelength ($\lambda$2) and traveling in the first direction through the thermal waveguide, wherein an output light including a wavelength component corresponding to a sum of energies of the first wavelength ($\lambda$1) and the second wavelength ($\lambda$2) is provided from the thermal waveguide.

The nonlinear optical crystal may be a periodically poled lithium niobate (PPLN)-based crystal, and a wavelength of the guide light is 532 nm.

The nonlinear optical crystal may have different periods depending on a position of the nonlinear optical crystal, and the wavelength of the output light may correspond to the period formed in the thermal wavelength.

The nonlinear optical crystal may include any one of a KTP-based material such as PPKTP, a KDP-based material, an ADP-based material, a BBO-based material, a KTA-based material, a GaSe-based material, a GaAs-based material, and a GAP-based material.

A wavelength of the guide light of the nonlinear optical crystal made of the KTP-based material may be 532 nm, a wavelength of the guide light of the nonlinear optical crystal made of the KDP-based material may be 1.3 µm, a wavelength of the guide light of the nonlinear optical crystal made of the ADP-based material may be 1.08 µm, a wavelength of the guide light of the nonlinear optical crystal made of the BBO-based material may be 2.5 µm, a wavelength of the guide light of the nonlinear optical crystal made of the KTA-based material may be 5 µm, and a wavelength of the guide light of the nonlinear optical crystal made of the GaSe-based material may be 0.65 µm.

The wavelength conversion device may further include a position adjusting unit that controls the position of the nonlinear optical crystal, wherein the wavelength of the output light changes depending on the position of the nonlinear optical crystal, which is controlled by the position adjusting unit.

The output light output from the thermal waveguide may include a wavelength corresponding to a difference between the energies of the first wavelength ($\lambda$1) and the second wavelength ($\lambda$2).

The wavelength conversion device may further include a guide optical system that adjusts a spot size of a beam of the guide light provided by the guide light source, a signal optical system that adjusts a spot size of a beam of the signal light provided by the signal light source, and a pump optical system that adjusts a spot size of the pump light provide by the pump light source.

The wavelength conversion device may further include an optical system that adjusts spot sizes of the guide light, the pump light, and the signal light.

The spot size of the beam of the guide light, the spot size of the beam of the signal light, and the spot size of the pump light may be adjusted to be equal to each other.

According to an embodiment, wavelength conversion device capable of controlling wavelength of output light in a broad wavelength range is presented.

BRIEF DESCRIPTION OF THE DRAWINGS

FIG. 2 is a view illustrating an outline of a wavelength conversion device according to another embodiment;

DETAILED DESCRIPTION

Figure 1:
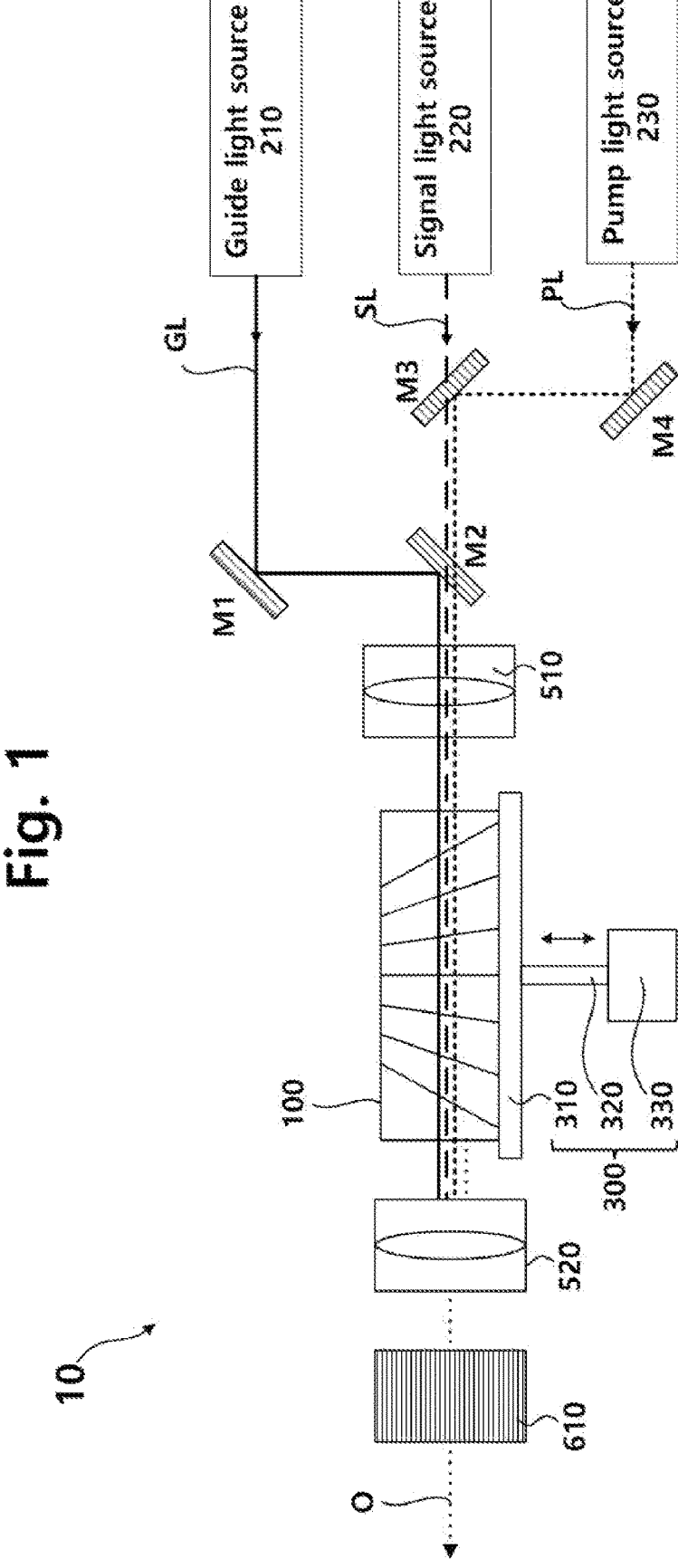
FIG. 1 is a view illustrating an outline of a wavelength conversion device according to an embodiment.
Figure 2:
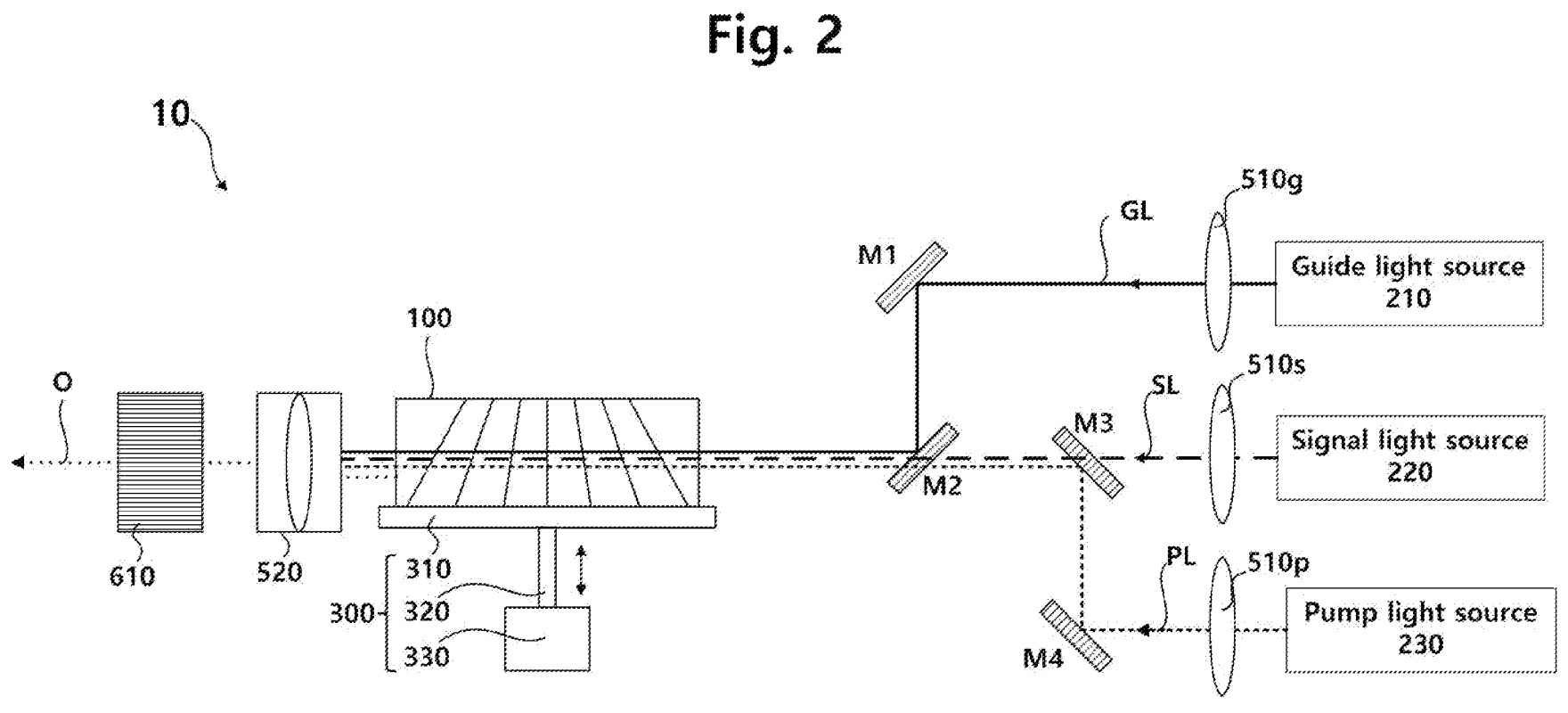

Hereinafter, embodiments will be described with reference to the accompanying drawings. FIGS. 1 and 2 are views illustrating an outline of a wavelength conversion device 10 according to the present embodiment. Referring to FIGS. 1 and 2, the wavelength conversion device 10 according to the present embodiment includes a nonlinear optical crystal 100, a guide light source 210 that outputs a guide light so that a thermal waveguide is formed in an optical path penetrating the nonlinear optical crystal 100, a signal light source 220 that provides a signal light having a first wavelength λ1 through a thermal waveguide 110 (see FIG. 5), and a pump light source 230 that provides a bump light having a second wavelength λ2 through the thermal waveguide 110 (see FIG. 5), wherein an output light O including a wavelength corresponding to a sum of the energies of the first wavelength λ1 and the second wavelength λ2 is provided from the thermal waveguide 110 (see FIG. 5).

As in the embodiment illustrated in FIG. 1, the guide light source 210 may provide a guide light GL in the same direction as a direction in which a signal light SL and a pump light PL travel within an optical path. In the embodiment illustrated in FIG. 1, the guide light GL, the signal light SL, and the pump light PL may be provided to the nonlinear optical crystal 100 through a single first optical system 510. However, as in the embodiment illustrated in FIG. 2, the guide light GL provided by the guide light source 210 may be provided to the nonlinear optical crystal 100 through a guide optical system 510g, the signal light SL provided by the signal light source 220 may be provided to the nonlinear optical crystal 100 through a signal optical system 510s, and the pump light PL provided by the pump light source 230 may be provided to the nonlinear optical crystal 100 through a pump optical system 510p.

Figure 3:
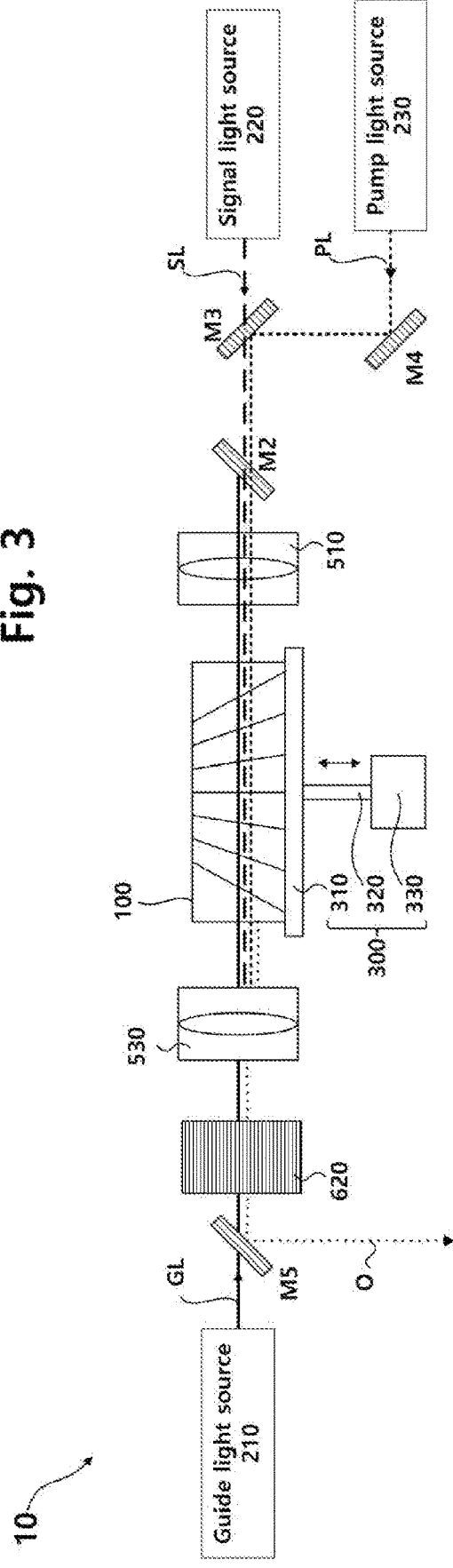
FIG. 3 is a view illustrating the outline of the wavelength conversion device according to another embodiment.

Further, as in the embodiment illustrated in FIG. 3, the guide light source 210 may provide the guide light GL in a direction opposite to the direction in which the signal light SL and the pump light PL travel within the optical path. As in the embodiment illustrated in FIG. 4, the signal light provided by the signal light source 220 may be provided to the nonlinear optical crystal 100 through a signal optical system 510s, and the pump light PL provided by the pump light source 230 may be provided to the nonlinear optical crystal 100 through the pump optical system 510p. In an embodiment that is not illustrated, the guide light GL provided by the guide light source 210 may be provided to the nonlinear optical crystal 100 through the guide optical system 510g.

Figure 4:
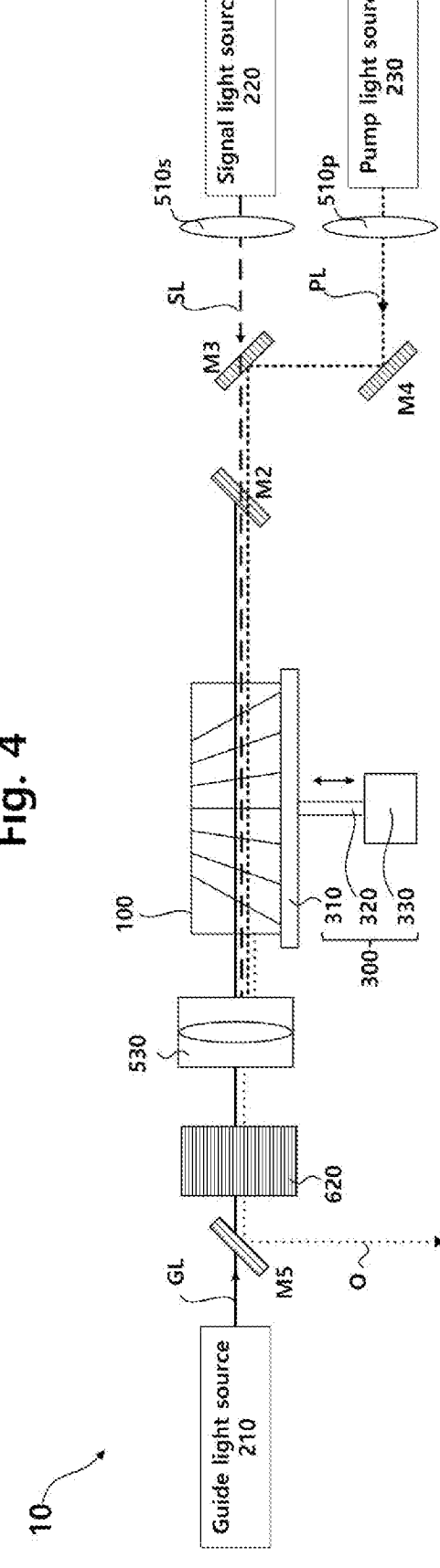
FIG. 4 is a view illustrating the outline of the wavelength conversion device according to another embodiment.
Figure 5:
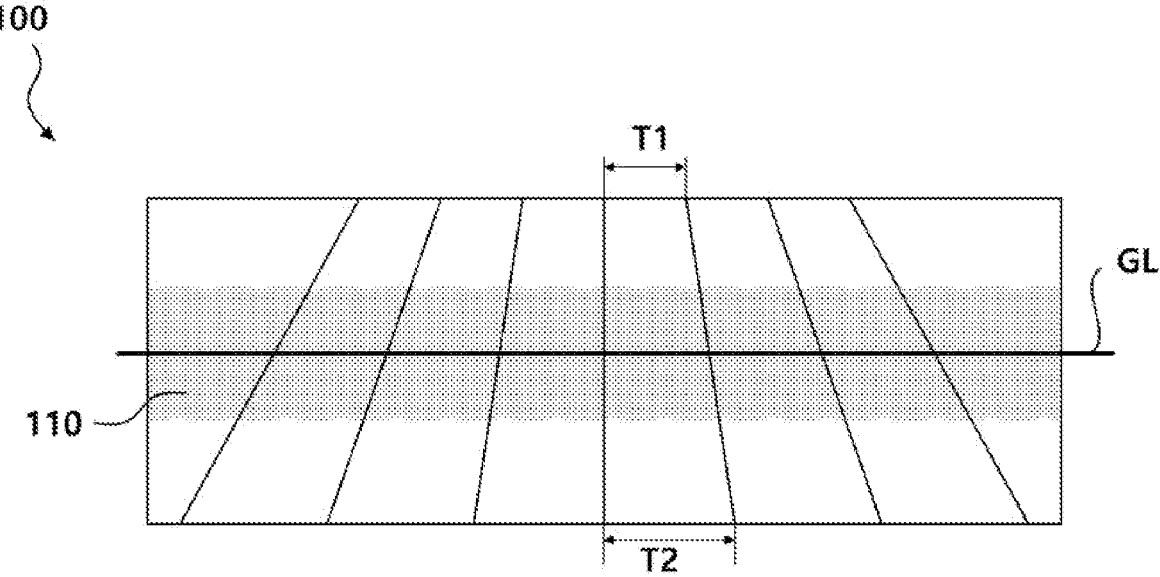
FIG. 5 is a schematic view illustrating a nonlinear optical crystal.

FIG. 5 is schematic view illustrating the nonlinear optical crystal 100. Referring to FIGS. 1 to 5, the nonlinear optical crystal 100 has a fan-out optical crystal structure. As illustrated in FIG. 5, in the nonlinear optical crystal 100, a period in which crystals are arranged may change depending on a position thereof. As illustrated, a period in which crystals are arranged at one position of the nonlinear optical crystal 100 may be T1, and a period in which crystals are arranged at a different position thereof may be T2.

In an embodiment, the nonlinear optical crystal may be a periodically poled lithium niobate (PPLN)-based material. As another example, the nonlinear optical crystal may be any one of a KTP-based material such as PPKTP, a KDP-based material, an ADP-based material, a BBO-based material, a KTA-based material, a GaSe-based material, a GaAs-based material, and a GAP-based material.

The guide light source 210 provides the guide light GL to the nonlinear optical crystal 100 to form the thermal waveguide 110 in the nonlinear optical crystal 100. In general, materials having different refractive indexes come into contact with each other to form the waveguide. However, when the nonlinear optical crystal 100 and a separate material having different refractive indexes come into contact with each other to form the waveguide, an output light is limited to a single wavelength.

As in the present embodiment, when the guide light GL is provided to the nonlinear optical crystal 100, energy of the guide light GL is absorbed by the nonlinear optical crystal 100. As the energy is absorbed by the nonlinear optical crystal 100, a refractive index around the optical path changes. A waveguide is formed around the optical path, which is similar to a case in which materials having different refractive indexes are in contact with each other, due to the changed refractive index. This is referred to as the thermal waveguide 110.

In the embodiment, a wavelength of the guide light GL may change depending on material properties of the nonlinear optical crystal 100. As an example, when the nonlinear optical crystal 100 is the PPLN, the guide light GL may be a light in a green band and may exemplarily have a wavelength of 532 nm.

Figure 6:
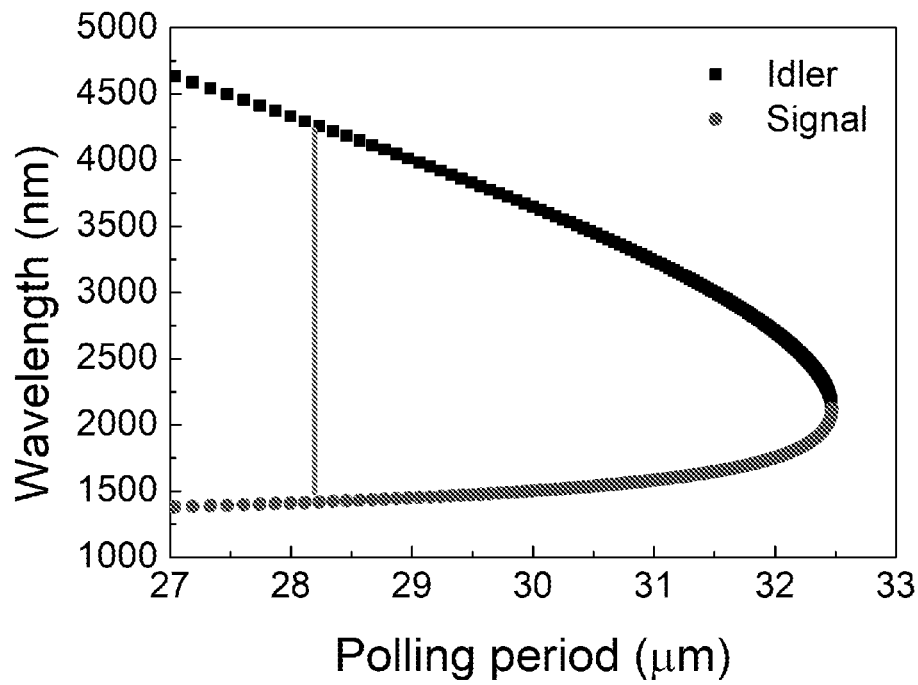
FIG. 6 is a view illustrating a wavelength that may be generated in a periodically poled lithium niobate (PPLN) nonlinear optical crystal.

FIG. 6 is a view illustrating a wavelength that may be generated in a PPLN nonlinear optical crystal. Referring to FIG. 6, the wavelength of the pump light PL is set to 1064 nm, and it can be identified that, when the pump light PL is input to the nonlinear optical crystal 100, the signal light illustrated in a gray color and lights having a black color, named idler, and having two wavelength bands are generated. In this case, a vertical line indicates a signal condition and an idler condition that may be generated simultaneously. Thus, it can be identified that a generated wavelength changes depending on a polling period of the nonlinear crystal indicated by a horizontal axis.

Figure 7:
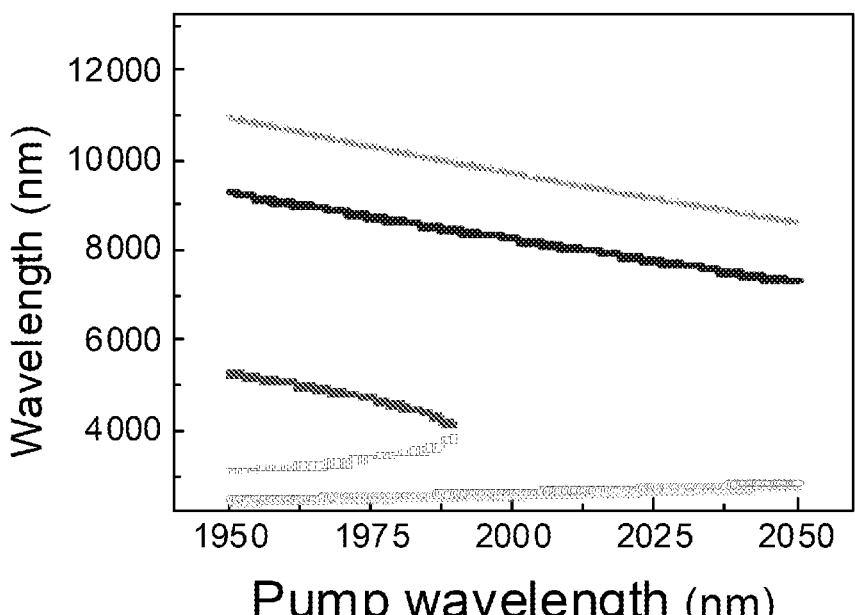
FIG. 7 is a view illustrating a wavelength that is generated according to a condition of a nonlinear optical crystal of OP-GaAs.

FIG. 7 is a view illustrating a wavelength that is generated according to a condition of a nonlinear optical crystal of OP-GaAs. Referring to FIG. 7, in the case of the OP-GaAs, it can be identified that, like the PPLN, different signals and different idlers may be generated according to a wavelength of the pump light PL (a light gray color and a dark gray color are results of turning the pump using crystals having different periods). Thus, it can be identified that even in the case of a nonlinear optical crystal of OP-GaAs, a wavelength of the output light may be controlled by controlling a period of an optical crystal in which the thermal waveguide 110 is formed.

In the embodiment, a wavelength of the signal light SL provided by the signal light source 220 and input to the thermal waveguide 110 and a wavelength of the pump light PL provided by the pump light source 230 and input to the thermal waveguide 110 may change depending on characteristics of a material that constitutes the nonlinear optical crystal 100. As an example, when the nonlinear optical crystal 100 is made of the PPLN, the wavelength of the signal light SL may be 1,550 nm, and the wavelength of the pump light PL may be 1,064 nm.

A wavelength of the guide light GL may change depending on a material constituting the nonlinear optical crystal 100. As an example, an LN-based material such as the PPLN and a KTP-based material such as the PPKTP may use a light having a wavelength of 532 nm as the guide light GL. Further, the KDP-based material may use a light having a wavelength of 1.3 m, the ADP-based material may use a light having a wavelength of 1.08 μm, the BBO-based material may use a light having a wavelength of 2.5 μm, a ZGP-based material may use a light having a wavelength of 1.9 μm, the KTA-based material may use a light having a wavelength of m, and the GaSe-based material may use a light having a wavelength of 0.65 μm. That is, a light irradiated from the material constituting the nonlinear optical crystal and having a wavelength band at which an absorption rate is high may be used as the guide light GL.

However, the material that constitutes the nonlinear optical crystal 100 and the wavelengths of the signal light SL and the pump light PL are not strictly determined, and effects similar to those of the present invention can be obtained even when lights having different wavelengths are used in the exemplified materials. Thus, the material that constitutes the nonlinear optical crystal 100 and the wavelengths of the signal light SL and the pump light PL are illustrative and are not intended to limit the scope of the present invention.

The wavelength conversion device 10 includes a position adjusting unit 300 that adjusts a position of the nonlinear optical crystal 100 with respect to the optical path. In the illustrated embodiment, the position adjusting unit 300 includes a seating table 310 on which the nonlinear optical crystal 100 is seated and positioned, a rod 320 that moves the seating table 310 so that a position of the seating table 310 is changed, and a driving unit 330 that drives the rod 320. In the embodiment, the driving unit 330 may be a precise control motor capable of precisely controlling the rod 320.

As the driving unit 330 moves the rod 320, a position of the optical path disposed on the seating table 310 and penetrating the nonlinear optical crystal 100 may change, and accordingly, a position of the thermal waveguide 110 formed on the nonlinear optical crystal 100 may also change.

Hereinafter, an operation of the wavelength conversion device 10 according to the present embodiment will be described with reference to the accompanying drawings. Referring to FIG. 1, the guide light source 210 provides the guide light GL. The guide light GL provided by the guide light source 210 is reflected by reflective members M1 and M2 and is provided to the nonlinear optical crystal 100 through the first optical system 510. As described above, the light that is provided to the nonlinear optical crystal 100 is absorbed by the nonlinear optical crystal 100, changes a refractive index, and thus forms the thermal waveguide 110.

The signal light SL provided by the signal light source 220 passes through reflective members M3 and M2 and is provided to the first optical system 510. Further, the pump light PL provided by the pump light source 230 is reflected by reflective members M4 and M3 and is provided to the first optical system 510. Further, as in the embodiment illustrated in FIG. 2, the guide light GL provided by the guide light source 210 may be provided to the nonlinear optical crystal 100 through the guide optical system 510g, the signal light SL provided by the signal light source 220 may be provided to the nonlinear optical crystal 100 through the signal optical system 510s, and the pump light PL provided by the pump light source 230 may be provided to the nonlinear optical crystal 100 through the pump optical system 510p.

In the embodiment, the reflective member M1 may be a mirror or a dichroic mirror capable of reflecting a light having the wavelength of the guide light GL, and the reflective member M2 may be a dichroic mirror capable of reflecting a light having the wavelength of the guide light GL but transmitting the signal light SL and pump light PL. The reflective member M4 may be a mirror or a dichroic mirror capable of reflecting a light having the wavelength of the pump light PL, and the reflective member M3 may be a dichroic mirror that transmits a light having the wavelength of the signal light SL but reflects the light having the wavelength of the pump light PL.

The first optical system 510 receives the guide light GL, the signal light SL, and the pump light PL and provides the guide light GL, the signal light SL, and the pump light PL to the nonlinear optical crystal 100. In the embodiment, the first optical system 510 adjusts beam spot sizes of the guide light GL, the signal light SL, and the pump light PL input to the nonlinear optical crystal 100 to be the same, and provides the adjusted beam spot sizes to the nonlinear optical crystal 100.

The signal light SL and the pump light PL propagate along the thermal waveguide 110 to form the output light of which the wavelength is converted. Since conversion efficiency of a light that escapes from the thermal waveguide 110 and propagates within the nonlinear optical crystal 100 decreases, the first optical system 510 controls the spot sizes of the signal light SL and the pump light PL so that the spot sizes of the signal light SL and the pump light PL are the same as the spot size of the guide light GL forming the thermal waveguide 110.

The signal light SL and the pump light PL input to the thermal waveguide 110 formed in the nonlinear optical crystal 100 form the output light O having a wavelength corresponding to the sum of energies thereof and/or the output light O having a wavelength corresponding to a difference between the energies. The output light O, the signal light SL, and the pump light PL are provided to a second optical system 520 and a first filter 610. The first filter 610 may selectively transmit a light having a wavelength band corresponding to the output light O.

Referring to FIG. 3, the guide light source 210 provides the guide light GL. The guide light GL provided by the guide light source 210 passes through the reflective member M5 and is provided to the nonlinear optical crystal 100 through a second filter 620. In the embodiment, the second filter 620 may be a filter that transmits the guide light GL and the output light O and blocks the signal light SL and the pump light PL.

As described above, the light provided to the nonlinear optical crystal 100 is absorbed by the nonlinear optical crystal 100, changes the refractive index, and forms the thermal waveguide 110. In the embodiment illustrated in FIG. 2, the guide light GL propagates in an opposite direction to the direction in which the signal light SL and the pump light PL travel in the nonlinear optical crystal 100 and thus forms the thermal waveguide 110. The guide light GL transmits the nonlinear optical crystal 100 but does not transmit the reflective member M2.

The signal light SL provided by the signal light source 220 passes through the reflective members M3 and M2 and is provided to the first optical system 510. Further, the pump light PL provided by the pump light source 230 is reflected by the reflective members M4 and M3 and is provided to the first optical system 510.

The first optical system 510 receives the signal light SL and the pump light PL and provides the received signal light SL and the received pump light PL to the nonlinear optical crystal 100. In the embodiment, the first optical system 510 adjusts the beam spot sizes of the signal light SL and the pump light PL input to the nonlinear optical crystal 100 to be the same and provides the adjusted beam spot sizes to the nonlinear optical crystal 100.

Further, as in the embodiment illustrated in FIG. 4, the signal light SL provided by the signal light source 220 may be provided to the nonlinear optical crystal 100 through the signal optical system 510s, and the pump light PL provided by the pump light source 230 may be provided to the nonlinear optical crystal 100 through the pump optical system 510p. In the embodiment that is not illustrated, the guide light GL provided by the guide light source 210 may be provided to the nonlinear optical crystal 100 through the guide optical system 510g.

The signal light SL and the pump light PL propagates along the thermal waveguide 110 to form the output light O of which the wavelength is converted. As described above, since conversion efficiency of the light that escapes from the thermal waveguide 110 and propagates within the nonlinear optical crystal 100 decreases, the first optical system 510 controls the spot sizes of the signal light SL and the pump light PL such that the spot sizes thereof are the same as the spot size of the guide light GL that forms the thermal waveguide 110.

The signal light SL and the pump light PL input to the thermal waveguide 110 formed in the nonlinear optical crystal 100 form the output light O having the wavelength corresponding to the sum of the energies thereof or the output light O having the wavelength corresponding to the difference between the energies thereof. The output light O, the signal light SL, and the pump light PL are provided to a third optical system 530 and the second filter 620. The second filter 620 may selectively transmit a light having a wavelength band corresponding to the output light O.

As illustrated, the guide light GL passes through the reflective member M5 and the second filter 620 and is provided to the nonlinear optical crystal 100, and the signal light SL, the pump light PL, and the output light O output from the nonlinear optical crystal 100 passes through the third optical system 530 and the second filter 620, is reflected by the reflective member M5, and is output. Thus, the reflective member M5 and the second filter 620 may be implemented as a dichroic mirror and an optical filter implemented to have corresponding reflection and transmission characteristics.

Hereinafter, a process of forming the output light from the signal light SL and the pump light PL propagating through the thermal waveguide 110 formed in the nonlinear optical crystal 100 will be described with reference to FIGS. 5 to 7. Referring to FIG. 5, the nonlinear optical crystal 100 has a fanout optical crystal structure. Thus, a period in which crystals are arranged changes depending on the position of the nonlinear optical crystal 100. A period in which crystals are arranged at any one position of the nonlinear optical crystal 100 may be T1, and a period in which crystals are arranged at the other position thereof may be T2.

As an example, a wavelength of the output light O formed from the pump light PL and the signal light SL propagating through the thermal waveguide 110 formed in an area in which crystals are arranged at the period T1 is different from a wavelength of the output light O formed from the pump light PL and the signal light SL propagating through the thermal waveguide 110 formed in an area in which crystals are arranged at the period T2.

Thus, the position adjusting unit 300 may adjust a position of the seating table 310 such that the thermal waveguide 110 through which a light propagates is formed at a desired portion inside the nonlinear optical crystal 100, and thus may control to output a light having a desired wavelength.

In the embodiment, the output light may have a wavelength corresponding to the sum of the energies of the pump light PL and the signal light SL. When the material constituting the nonlinear optical crystal 100 is the PPLN, in the wavelength of the light output from the nonlinear optical crystal 100, when the wavelength of the pump light PL is 1,550 nm and the wavelength of the signal light SL is 3,400 nm, a wavelength $\lambda_O$ of the output light is as follows as in Equation 1.

$$\frac{1}{\lambda_O} = \frac{1}{\lambda_{SL}} + \frac{1}{\lambda_{PL}} \qquad \text{[Equation 1]}$$
$$= \frac{1}{3400} + \frac{1}{1550}$$
$$\lambda_O = 1064 \text{ nm}$$

In another embodiment, the output light may output a wavelength corresponding to the difference between the energies of the pump light PL and the signal light SL. In this case, when the material constituting the nonlinear optical crystal 100 is the PPLN, the wavelength of the light output from the nonlinear optical crystal 100 can be calculated as in Equation 2. When the wavelength of the signal light SL is 1,550 nm and the wavelength of the pump light PL is 1,064 nm, the wavelength $\lambda_O$ of the output light is as follows.

$$\frac{1}{\lambda_O} = \frac{1}{\lambda_{PL}} - \frac{1}{\lambda_{SL}} \qquad \text{[Equation 2]}$$
$$= \frac{1}{1064} - \frac{1}{1550}$$
$$\lambda_O = 3393 \text{ nm} \approx 3400 \text{ nm}$$

For example, the output light O formed in this way may be output in both the wavelength corresponding to the sum of the energies and the wavelength corresponding to the difference between the energies or may be output in only the wavelength corresponding to one of the sum and the difference.

Thus, the position adjusting unit 300 may adjust a position of the seating table 310 such that the thermal waveguide 110 through which a light propagates is formed in a desired portion inside the nonlinear optical crystal 100, and thus may control to output a light having a desired wavelength. Furthermore, the wavelength of the output light can be controlled in a wide range by precisely adjusting the wavelengths of the pump light PL and the signal light SL and positions at which the pump light PL and the signal light SL are input to the nonlinear optical crystal 100.

Experimental Example

Figure 8:
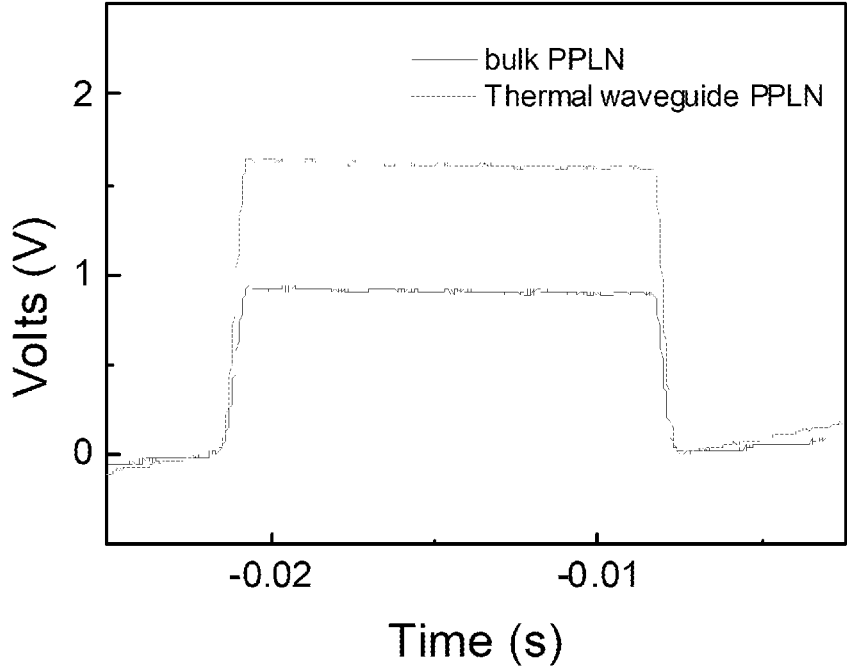
FIG. 8 is a view illustrating efficiency in a state in which a thermal waveguide is not formed and in a state in which the thermal waveguide is formed when the nonlinear optical crystal is formed by a PPLN.

FIG. 8 is a view illustrating efficiency in a state in which a thermal waveguide is not formed and in a state in which the thermal waveguide is formed when the nonlinear optical crystal is formed by a PPLN. Referring to FIG. 8, a low-amplitude solid line on a lower side indicates an output light output from a nonlinear crystal in a state in which a thermal waveguide is not formed, and a high-amplitude solid line on an upper side indicates a size of a signal of the output light in a state in which the thermal waveguide is generated by a guide light. As clearly illustrated in FIG. 9, it can be identified that the thermal waveguide may be formed to increase the size of the output light, and the wavelength-converted output light may be obtained with higher efficiency.

Figure 9:
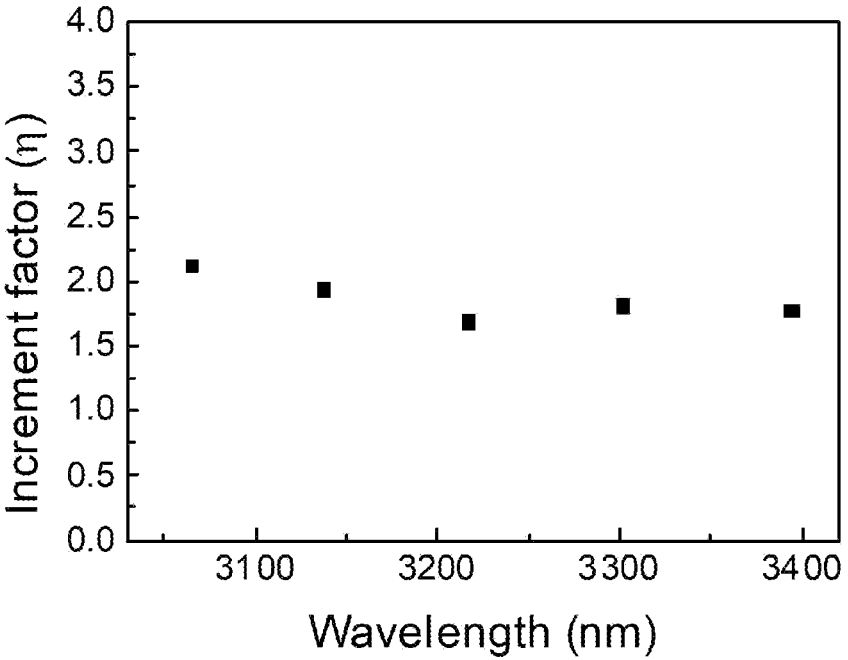
FIG. 9 is a view illustrating a result of measuring an increase in conversion efficiency according to wavelength variation when the nonlinear optical crystal is formed by the PPLN.

FIG. 9 is a view illustrating a result of measuring an increase in conversion efficiency according to wavelength variation when the nonlinear optical crystal is formed by the PPLN. Referring to FIG. 9, in a state in which the thermal waveguide is induced, a wavelength-converted signal may be identified in a wide wavelength range of 3,064 nm to 3,393 nm. In this case, it can be identified that conversion efficiency increases to about twice as much as the signal generated from the nonlinear crystal in a normal state.

According to an embodiment, a wavelength conversion device capable of controlling a wavelength of an output light in a wide wavelength range.

Although the present disclosure has been described with reference to the embodiments illustrated in the drawings to help understanding of the present disclosure, the description is embodiments for implementation, and is merely illustrative, and those skilled in the art may thus understand that various modifications and equivalent other embodiments may be derived from the description. Thus, the true technical scope of the present disclosure should be determined by the appended claims.

The invention claimed is:

1. A wavelength conversion device comprising:
a nonlinear optical crystal;
a guide light source configured to provide a guide light traveling in a first direction within the nonlinear optical crystal such that a thermal waveguide penetrating the nonlinear optical crystal is formed;
a signal light source configured to provide a signal light having a first wavelength ($\lambda$1) and traveling in a second direction opposite to the first direction through the thermal waveguide; and
a pump light source configured to provide a pump light having a second wavelength ($\lambda$2) and traveling in the second direction through the thermal waveguide, wherein an output light including a wavelength component corresponding to a sum of energies of the first wavelength ($\lambda$1) and the second wavelength ($\lambda$2) is provided from the thermal waveguide.

2. The wavelength conversion device of claim 1, wherein the nonlinear optical crystal is a periodically poled lithium niobate (PPLN)-based material, and
a wavelength of the guide light is 532 nm.

3. The wavelength conversion device of claim 1, wherein the nonlinear optical crystal has different periods depending on a position of the nonlinear optical crystal, and
the wavelength of the output light corresponds to a period, of the different periods depending on the position of the nonlinear optical crystal, formed in the thermal waveguide.

4. The wavelength conversion device of claim 3, further comprising a position adjusting unit configured to control the position of the nonlinear optical crystal, wherein the wavelength of the output light changes depending on the position of the nonlinear optical crystal, which is controlled by the position adjusting unit.

5. The wavelength conversion device of claim 1, wherein the nonlinear optical crystal includes any one of a KTP-based material, a KDP-based material, an ADP-based material, a BBO-based material, a KTA-based material, a GaSe-based material, a GaAs-based material, and a GAP-based material.

6. The wavelength conversion device of claim 5, wherein a wavelength of the guide light of the nonlinear optical crystal made of the KTP-based material is 532 nm, a wavelength of the guide light of the nonlinear optical crystal made of the KDP-based material is 1.3 μm, a wavelength of the guide light of the nonlinear optical crystal made of the ADP-based material is 1.08 μm, a wavelength of the guide light of the nonlinear optical crystal made of the BBO-based material is 2.5 μm, a wavelength of the guide light of the nonlinear optical crystal made of the KTA-based material is 5 μm, and a wavelength of the guide light of the nonlinear optical crystal made of the GaSe-based material is 0.65 μm.

7. The wavelength conversion device of claim 1, wherein the output light output from the thermal waveguide includes a wavelength corresponding to a difference between the energies of the first wavelength ($\lambda$1) and the second wavelength ($\lambda$2).

8. The wavelength conversion device of claim 1, further comprising:
a guide optical system configured to adjust a spot size of a beam of the guide light provided by the guide light source;
a signal optical system configured to adjust a spot size of a beam of the signal light provided by the signal light source; and
a pump optical system configured to adjust a spot size of the pump light provided by the pump light source.

9. The wavelength conversion device of claim 8, wherein the spot size of the beam of the guide light, the spot size of the beam of the signal light, and the spot size of the pump light are adjusted to be equal to each other.

10. The wavelength conversion device of claim 1, further comprising an optical system configured to adjust spot sizes of the guide light, the pump light, and the signal light.

11. A wavelength conversion device comprising:
a nonlinear optical crystal;
a guide light source configured to provide a guide light traveling in a first direction within the nonlinear optical crystal such that a thermal waveguide penetrating the nonlinear optical crystal is formed;
a signal light source configured to provide a signal light having a first wavelength ($\lambda$1) and traveling in the first direction through the thermal waveguide; and
a pump light source configured to provide a pump light having a second wavelength ($\lambda$2) and traveling in the first direction through the thermal waveguide,
wherein an output light including a wavelength component corresponding to a sum of energies of the first wavelength ($\lambda$1) and the second wavelength ($\lambda$2) is provided from the thermal waveguide.

12. The wavelength conversion device of claim 11, wherein the nonlinear optical crystal is a periodically poled lithium niobate (PPLN)-based material, and
a wavelength of the guide light is 532 nm.

13. The wavelength conversion device of claim 11, wherein the nonlinear optical crystal has different periods depending on a position of the nonlinear optical crystal, and the wavelength of the output light corresponds to a period, of the different periods depending on the position of the nonlinear optical crystal, formed in the thermal wavelength waveguide.

14. The wavelength conversion device of claim 13, further comprising a position adjusting unit configured to control the position of the nonlinear optical crystal, wherein the wavelength of the output light changes depending on the position of the nonlinear optical crystal, which is controlled by the position adjusting unit.

15. The wavelength conversion device of claim 11, wherein the nonlinear optical crystal includes any one of a KTP-based material, a KDP-based material, an ADP-based material, a BBO-based material, a KTA-based material, a GaSe-based material, a GaAs-based material, and a GAP-based material.

16. The wavelength conversion device of claim 15, wherein a wavelength of the guide light of the nonlinear optical crystal made of the KTP-based material is 532 nm, a wavelength of the guide light of the nonlinear optical crystal made of the KDP-based material is 1.3 μm, a wavelength of the guide light of the nonlinear optical crystal made of the ADP-based material is 1.08 μm, a wavelength of the guide light of the nonlinear optical crystal made of the BBO-based material is 2.5 μm, a wavelength of the guide light of the nonlinear optical crystal made of the KTA-based material is 5 μm, and a wavelength of the guide light of the nonlinear optical crystal made of the GaSe-based material is 0.65 μm.

17. The wavelength conversion device of claim 11, wherein the output light output from the thermal waveguide includes a wavelength corresponding to a difference between the energies of the first wavelength ($\lambda 1$) and the second wavelength ($\lambda 2$).

18. The wavelength conversion device of claim 11, further comprising:

a guide optical system configured to adjust a spot size of a beam of the guide light provided by the guide light source;

a signal optical system configured to adjust a spot size of a beam of the signal light provided by the signal light source; and a pump optical system configured to adjust a spot size of the pump light provided by the pump light source.

19. The wavelength conversion device of claim 18, wherein the spot size of the beam of the guide light, the spot size of the beam of the signal light, and the spot size of the pump light are adjusted to be equal to each other.

20. The wavelength conversion device of claim 11, further comprising an optical system configured to adjust spot sizes of the guide light, the pump light, and the signal light.

\*   \*   \*   \*   \*